US00RE41256E

(19) United States
(12) Reissued Patent
Ozawa et al.

(10) Patent Number: US RE41,256 E
(45) Date of Reissued Patent: Apr. 20, 2010

(54) AUDIO TRANSMISSION, RECORDING AND REPRODUCING SYSTEM

(75) Inventors: Kazunori Ozawa, Kanagawa (JP); Nobuhiro Tone, Tokyo (JP); Masahiro Asai, Kanagawa (JP)

(73) Assignee: Sony Corporation, Tokyo (JP)

(21) Appl. No.: 12/236,082

(22) Filed: Sep. 23, 2008

Related U.S. Patent Documents

Reissue of:
(64) Patent No.: 5,870,710
Issued: Feb. 9, 1999
Appl. No.: 08/785,958
Filed: Jan. 22, 1997

U.S. Applications:
(

(63) Continuation of application No. 09/767,811, filed on Jan. 23, 2001.

(30) Foreign Application Priority Data

Jan. 24, 1996 (JP) ..... P08-030004

(51) Int. Cl.
*H05K 11/00* (2006.01)
*G10L 19/00* (2006.01)

(52) U.S. Cl. ..... 704/500; 455/575.2; 455/351; 455/350; 455/344; 381/384; 381/385; 700/94; 704/201

(58) Field of Classification Search ..... 704/500, 704/201; 455/344, 575.2, 351, 350, 550.1; 360/48; 381/385, 74, 309, 384; 700/94; 369/84, 369/124.06

See application file for complete search history.

(56) References Cited

U.S. PATENT DOCUMENTS 5,086,475 A 2/1992 Kutaragi (Continued)

FOREIGN PATENT DOCUMENTS

| | | |
|---|---|---|
| DE | 3820835 | 1/1989 |
| EP | 0467208 A1 | 1/1992 |
| EP | 0 467 208 | 1/1992 |
| EP | 0 505 304 | 9/1992 |
| EP | 0649121 A2 | 4/1995 |
| EP | 0649121 | 4/1995 |
| EP | 0 706 114 | 1/1996 |
| EP | 0763939 A2 | 3/1997 |

(Continued)

OTHER PUBLICATIONS

Mobiles Computing DOS International, No. 2.95, pp. 65–70, "Am High–End Ist Die Hölle Los", Feb. 1995.
Patent Abstracts of Japan, JP 02–137010, May 25, 1990.
S. Putz, "Interactive Information Services Using World–Wide Hypertext, " Computer Networks and ISDN Systems, vol. 27, No. 2, Nov. 1994, pp. 273–280.
DOS International, Die PC–Zeitschrift, "Mobiles Computing, " Feb. 1995, DMVVerlag, pp. 65–70.

*Primary Examiner*—Vijay B Chawan
(74) *Attorney, Agent, or Firm*—Oblon, Spivak, McClelland, Maier & Neustadt, L.L.P.

(57) ABSTRACT

An audio recording and reproducing apparatus includes a controller for controlling the entire behaviors, hard disc for write and read of audio data, audio compression/expansion circuit for expanding compressed audio data, and external I/O port. The audio recording and reproducing apparatus is connected to a network service center to obtain desired music data from storage of the network service center and to store it in the hard disc.

18 Claims, 7 Drawing Sheets

U.S. PATENT DOCUMENTS

| | | | | | |
|---|---|---|---|---|---|
| 5,359,698 | A | | 10/1994 | Goldberg et al. | |
| 5,438,643 | A | | 8/1995 | Akagiri et al. | |
| 5,491,774 | A | | 2/1996 | Norris | |
| 5,544,228 | A | | 8/1996 | Wagner | |
| 5,566,154 | A | | 10/1996 | Suzuki | |
| 5,619,570 | A | | 4/1997 | Tsutsui | |
| 5,806,023 | A | * | 9/1998 | Satyamurti | 704/211 |
| 5,841,979 | A | | 11/1998 | Schulhof et al. | |
| 5,870,710 | A | * | 2/1999 | Ozawa et al. | 704/500 |
| 6,076,063 | A | | 6/2000 | Unno et al. | |
| 6,397,000 | B1 | * | 5/2002 | Hatanaka et al. | 386/98 |
| 6,714,920 | B1 | * | 3/2004 | Arai | 705/52 |
| 6,748,485 | B1 | | 6/2004 | Yokota et al. | |
| 6,763,253 | B1 | * | 7/2004 | Niehoff et al. | 455/575.1 |
| 6,876,661 | B2 | * | 4/2005 | Asai | 370/401 |
| 6,889,043 | B2 | * | 5/2005 | Okazaki et al. | 455/435.1 |
| 6,963,860 | B1 | | 11/2005 | Tsutsui et al. | |
| 6,987,970 | B2 | * | 1/2006 | Okazaki et al. | 455/435.1 |
| 7,130,631 | B2 | * | 10/2006 | Okazaki et al. | 455/435.1 |
| 2002/0147688 | A1 | * | 10/2002 | Arai | 705/52 |
| 2003/0176194 | A1 | * | 9/2003 | Farmer et al. | 455/455 |

FOREIGN PATENT DOCUMENTS

| | | |
|---|---|---|
| EP | 0763939 | 3/1997 |
| EP | 97 10 1119 | 1/1998 |
| EP | 01 11 1429 | 11/2001 |
| EP | 01 11 1430 | 11/2001 |
| JP | 04-369754 | 12/1992 |
| JP | 05-036293 | 2/1993 |
| JP | 6-131371 | 5/1994 |
| JP | 06-314172 | 11/1994 |
| JP | 7-84675 | 3/1995 |
| JP | 7-147063 | 6/1995 |
| JP | 08-016285 | 1/1996 |
| JP | 08-023315 | 1/1996 |
| JP | 9-504397 | 4/1997 |
| WO | WO 93/16550 | 8/1993 |
| WO | WO 94/29852 | 12/1994 |
| WO | WO 95/12168 | 5/1995 |
| WO | WO 95/30212 | 11/1995 |

* cited by examiner

Fig. 3A

▷ 1 CLASSICAL
2 JAZZ
3 POP
4 COUNTRY

Fig. 3B

1 BEETHOVEN NO. 1
▷ 2 BEETHOVEN NO. 2
3 SCHUBERT NO. 1
4 SCHUBERT NO. 2

Fig. 4

| HEADER | AUDIO DATA |
|---|---|

AUDIO TRANSMISSION, RECORDING AND REPRODUCING SYSTEM

Matter enclosed in heavy brackets [ ] appears in the original patent but forms no part of this reissue specification; matter printed in italics indicates the additions made by reissue.

*More than one reissue application has been filed for the reissue of U.S. Pat. No. 5,870,710. The reissue applications are application Ser. No. 09/767,811 (Patent reissue application), filed Jan. 23, 2001 and Ser. No. 12/200,616 (the first reissue continuation application), filed Aug. 29, 2008, and present reissue continuation application.*

BACKGROUND OF THE INVENTION

1. Field of the Invention

This invention relates to an audio reproducing apparatus and method, audio recording apparatus and method, audio recording and reproducing system, audio data transmission method, information receiving apparatus, and recording medium which are particularly suitable for use in a headphone stereo, and in particular to those configured to store in a portable stereo headphone desired audio data externally transmitted to the portable headphone stereo.

2. Description of the Related Art

Among portable headphone stereo devices with which a user can enjoy reproduced music either during his walk or in an automobile, most widely distributed are those using an analog-recording magnetic tape such as compact cassette. A user of a portable headphone stereo using an analog-recording magnetic tape typically records in a compact cassette a desired piece of music selected from FM broadcasting programs, CDs (compact discs) or other music sources, and sets the compact cassette in his portable headphone stereo to enjoy audio reproduction either during his walk or in an automobile.

However, as long as compact cassettes or other analog-recording magnetic tapes are used, great improvements in quality of sound are not prospective, and dubbing causes deterioration of signals. Moreover, it takes a long time for a user to record desired pieces of music from CD or other music sources. Additionally, with compact cassettes or other magnetic tapes, the access time is slow, and a user cannot quickly search out, reproduce or repeat his desired music.

Some portable headphone stereos use CDs. Since CDs are media exclusive for recording, a user of portable headphone CD stereo buys CD recorded with his desired music, and places the CD in his portable headphone CD stereo to enjoy audio reproduction during his walk or in an automobile. CDs are digital recording media, the quality of sound is excellent. The access speed is high, and any desired music can be reproduced quickly. However, since CD headphone stereos are exclusively for reproduction, users cannot make their own music sources compiling their desired pieces of music. Moreover, CD headphone stereos are affected by vibrations, and sound is often skipped over due to the external vibrations.

Also known are portable headphone stereo players using DAT (digital audio tape), NT (non-tracking, tape(trade mark)) or other digital-recording magnetic tapes as their recording media. Deterioration of signals by dubbing hardly occurs in devices using DAT, NT or other digital magnetic tapes. DAT promises audio reproduction of a very high quality of sound. NT permits recording over a long time in a very small cassette. Here again, however, devices using magnetic tapes involve the same problems that the access speed is slow and it takes a long time for repeated reproduction or cue search of a desired piece of music.

Another type of portable headphone stereo players uses MD (mini-disk(trade mark)). MDs are media for both recording and reproduction, and users can record their desired pieces of music on MDs from CD or other music sources and can place them in their portable MD headphone stereos to enjoy reproduced music during a walk or in an automobile. MDs are digital-recording media, and promise an excellent quality of sound. The access speed is high, and any desired music can be reproduced quickly. As a shock-proof memory is used, devices are less affected by external vibrations.

As reviewed above, various kinds of recording media have been proposed for use in portable headphone stereos. However, none of these recording media used in conventional portable headphone stereos meet all requirements from the viewpoints of easy use and quality of sound.

Devices using analog-recording compact cassettes have a problem in quality of sound. These using DAT, NT or other digital-recording magnetic tapes have a problem in access speed. CDs are exclusively for reproduction and weak against vibrations. MDs can be used for both recording and reproduction and can be miniaturized but, since the number of titles of MD on sale is not abundant, it is sometimes difficult for users to obtain their desired music. It takes time to dub CD or other music sources.

Another problem with MDs is the use of ATRAC (Adaptive Transform Acoustic Coding) compression and expansion ICs or other ICs developed for exclusive use in MDs and the use of a particular architecture, i.e., a particular circuit arrangement as a method for actually mounting the ICs in order to reduce the entire dimension and decrease the cost. Therefore, such devices cannot be used in different ways, namely, for recording and reproducing a recording medium other than MDs, for example.

Moreover, tastes of users for music are diverged more and more, and the fashion of music largely changes in a short time. It is difficult to exactly catch the fashion of music with conventional music recording media.

Taking it into account, the present Applicant previously proposed a portable headphone stereo discussed in Japanese Patent Laid-Open No. hei 06-131371 U.S. Ser. No. 08/131,943, which is configured to write music information in semiconductor memory used as a recording medium to enable reproduction of the music information any time. However, its interior circuit arrangement comprises an exclusive IC and an exclusive architecture, and is in the case of MDs, cannot realize wider use and extensive use of the device.

OBJECTS AND SUMMARY OF THE INVENTION

It is therefore an object of the invention to provide an audio reproducing apparatus and method, audio recording apparatus and method, audio recording and reproducing system, audio data transmission method, information receiving apparatus, and recording medium that promise wider use and extensive use and promise easy use and a high quality of reproduced sound.

Another object of the invention is to provide an audio reproducing apparatus and method, audio recording apparatus and method, audio recording and reproducing system, audio data transmission method, information receiving apparatus, and recording medium that are prospective for developments and can quickly cope with users tastes for music and music in fashion.

According to the invention, there is provided an audio reproducing apparatus comprising: control means for controlling entire behaviors; storage means for writing and reading data; audio expanding means for expanding compressed audio data; external I/O means for exchanging incoming data; and a personal computer standard bus for transmitting data among the control means, storage means, audio expanding means and external I/O means, so that compressed audio data is stored in the storage means, and the compressed audio data is transferred to and expanded by the audio expanding means to be audibly reproduced.

According to another aspect of the invention, there is provided an audio recording apparatus comprising: control means for controlling entire behaviors; storage means for writing and reading data; audio expanding means for expanding compressed audio data; external I/O means for exchanging incoming data; and a personal computer standard bus for transmitting data among the control means, storage means, audio expanding means and external I/O means, in which data sent in a predetermined format is introduced through the external I/O means, and compressed audio data is taken out from the introduced data and stored in the storage means.

According to another aspect of the invention, there is provided an audio reproducing method comprising the steps of: storing compressed audio data in storage means; reading the compressed audio data stored in the storage means and delivering same to audio expanding means; and reproducing audio data in the audio expanding means.

According to another aspect of the invention, there is provided an audio recording method comprising the steps of: introducing data sent through external I/O means in a predetermined format; taking compressed audio data from the data introduced through the external I/O means; and storing the compressed audio data in storage means.

According to another aspect of the invention, there is provided an audio recording and reproducing system comprising: an audio recording and reproducing apparatus incorporating control means for controlling entire behaviors, storage means for writing and reading data, audio expanding means for expanding compressed audio data, and external I/O means for exchanging incoming data; first functional means removably attached to the audio recording and reproducing apparatus to add a supplementary function to the audio recording and reproducing apparatus; and second functional means removably attached to the audio recording and reproducing apparatus to add a new function to the audio recording and reproducing apparatus.

According to another aspect of the invention, there is provided an audio data transmission method for receiving desired audio data through a communication line from an audio data base storing a plurality of pieces of audio data, storing the audio data on the part of a receiver to reproduce it there later, the audio data base being configured to send out data to the receiver in a predetermined transmission format for and to charge fees for the service on the account of the receiver.

According to another aspect of the invention, there is provided an information receiving apparatus comprising: means for choosing desired audio data from an audio data base storing a plurality of pieces of audio data; means for receiving desired audio data through a communication line and for storing the chosen audio data; and means for reproducing the stored audio data.

According to another aspect of the invention, there is provided a recording medium that receives desired audio data through a communication line from an audio data base storing a plurality of pieces of audio data and stores the chosen audio data.

Digital portable stereo headphone players are connected to a network service center by public telephone line (for example ISDN) lines. Each player obtains desired music data from a number of pieces of music supplied from the network service center, stores it in a hard disc, and reproduces the music from the hard disc. Since the audio data is recorded in a digital form, a high quality of sound is promised. By using a card type hard disc, a high access speed and an increase in dimension and weight are promised. Since a user can choose desired music from the storage of the network service center, he can use his player conveniently by obtaining any desired music any time from a large storage in the service center. Therefore, the system can satisfy various users tastes for music and can follow the latest fashion of music. Where a digital portable stereo headphone player is fixed on a base station, then a communication function is added to the player, and the battery of the player can be electrically charged simultaneously. Any new additional function can be added to a digital portable stereo headphone player by mounting an extensive function card, and this promises further developments of such players.

BRIEF DESCRIPTION OF THE DRAWINGS

FIGS. 3A and 3B are schematic diagrams for use in explanation of an audio data transmission system to which the invention is applied;

FIG. 4 is a schematic diagram for use in explanation of an audio data transmission system to which the invention is applied;

DETAILED DESCRIPTION OF THE PREFERRED EMBODIMENTS

An embodiment of the invention is described below with reference to the drawings. Basically, a digital portable headphone stereo using the invention is connected through the public telephone line to a network service center that supplies a number of music data, so as to obtain desired music data from the network service center, record it in a hard disc, and reproduce the music data later to enjoy music.

Figure 1:
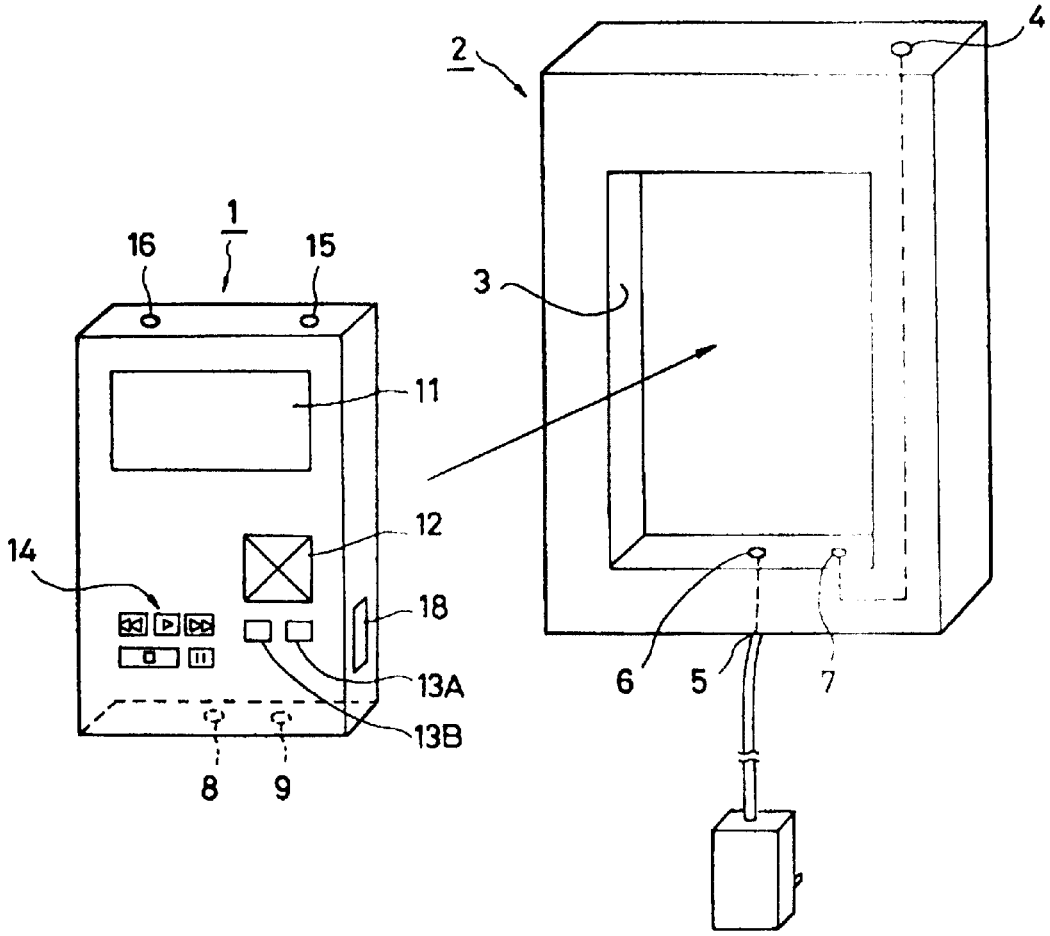
FIG. 1 is a perspective view for use in explanation of a digital portable headphone stereo to which the invention is applied.
Figure 5:
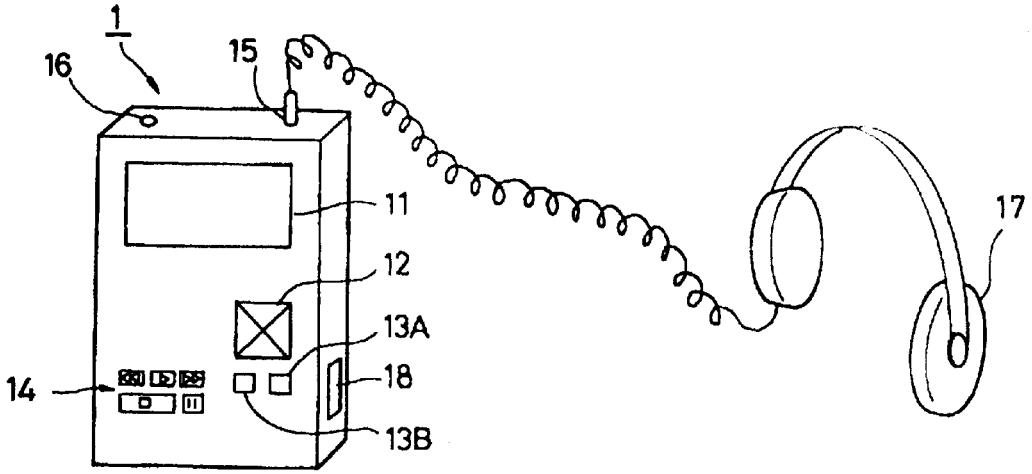
FIG. 5 is a perspective view for use in explanation of a digital portable headphone stereo to which the invention is applied.

FIG. 1 shows a home terminal system in a digital portable headphone stereo system using the invention. In FIG. 1, numeral 1 denotes the digital portable headphone stereo. The digital portable headphone stereo 1 contains a hard disc to store music data sent by data transmission as explained later in greater detail.

Numeral 2 denotes a base station having a cavity 3 for receiving and fixing the entirety of the digital portable headphone stereo 1 in the base station 2.

The base station 2 is typically fixed on an interior wall of a house, for example. The base station 2 is used to control communication with the network service station, explained later, and to supply power to the battery of the digital portable headphone stereo 1 inserted into the cavity 3. More specifically, a communication control terminal 4 extends from the base station 2, and coupled to ISDN or other communication line. A power supply terminal 5 also extends from the base station 2 to introduce power. In the cavity 3 of the base station 2, there are provided a power supply terminal 6 for supplying power to the battery of the digital portable headphone stereo 1 and a data IN/OUT terminal 7 for exchanging data between the network service station and the digital portable headphone stereo 1.

When a user wants to carry the digital portable headphone stereo 1 with him, he removes the digital portable headphone stereo 1 from the base station 2 and carries the head phone stereo 1 alone with him.

Upon recording data in the digital portable headphone stereo 1 or upon charging the battery of the headphone stereo 1 with power, the digital portable headphone stereo 1 is set in the cavity 3 of the base station 2.

Then the digital portable headphone stereo 1 fits in the cavity 3 of the base station 2, a power supply terminal 8 and a data IN/OUT terminal 9 on the bottom plane of the digital portable headphone stereo 1 mate with and electrically connected to the power supply terminal 6 and the data IN/OUT terminal 7 in the cavity 3 of the base station 2. As a result, the battery of the portable headphone stereo 1 is charged, and the portable headphone stereo 1 is ready for communication with the network service station through the ISDN line.

Provided on the front face of the digital portable headphone stereo 1 are a liquid crystal display 11, direction key 12, and input keys 13A, 13B. Further provided on the front face of the digital portable headphone stereo 1 are mode keys 14 such as fast-forward, play, rewind, stop and pause keys. The digital portable headphone stereo 1 also has a headphone terminal 15 and a microphone terminal 16 on its upper surface.

As explained above, the portable headphone stereo 1 is used for obtaining music data from the network service center, then recording the music data on the hard disc, and reproducing the music data recorded on the hard disc.

Figure 2:
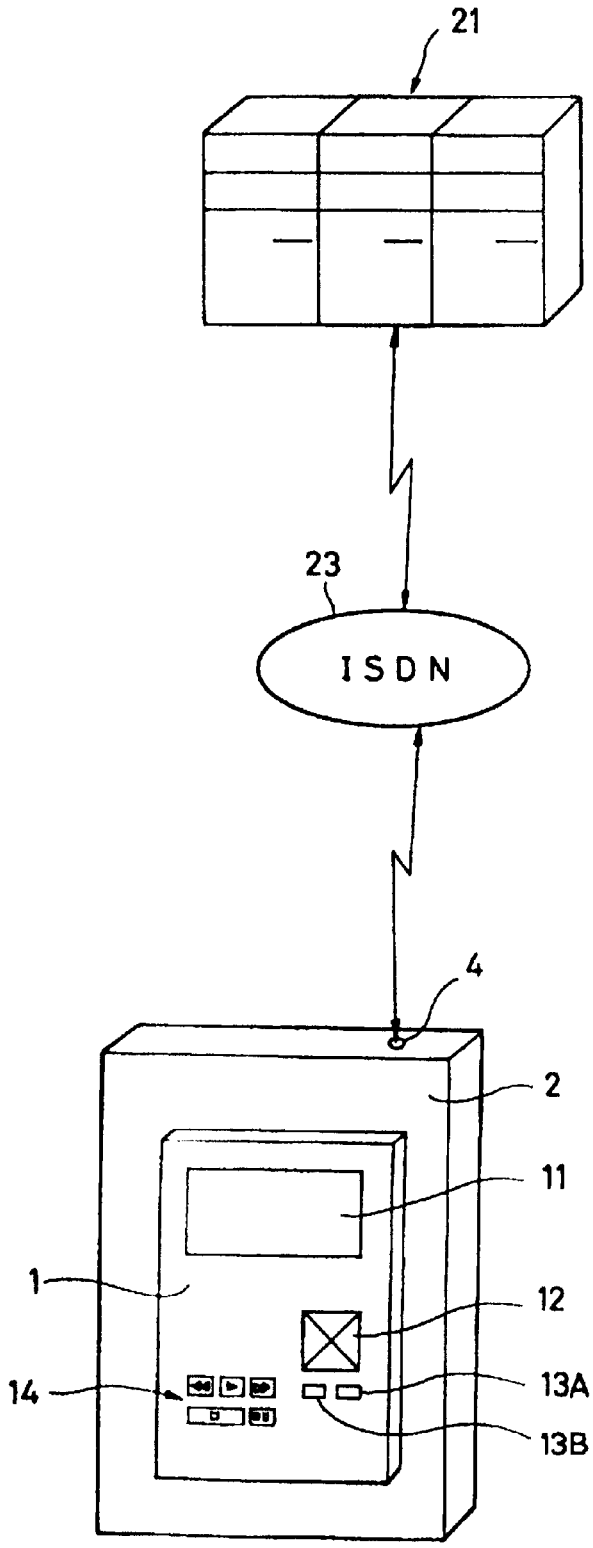
FIG. 2 is a perspective view for use in explanation of an audio data transmission system to which the invention is applied.

FIG. 2 shows an aspect of transmission of data from a network service center to a digital portable headphone stereo. In FIG. 2, numeral 21 denotes the network service center that prepares music sources to be supplied to users. The network service center 21 stores many pieces of music data and can be accessed from an external terminal through a public telephone line 23, for example an ISDN. The network service 21 charges fees for the use of music data on users accounts under an agreement concluded with the users. Any appropriate fee systems may be employed among charging a fixed fee per piece of music, charging a monthly or yearly fixed fee, charging a fixed fee per unit period of time, and so forth.

In addition to transmission of music data from the network service center 21 to users, the system may be configured to permit uploading of users own music to the network service center 21. In this case, it is desirable that an appropriate amount is paid to a user who supplied musical information to the service center 21, also taking his copyright into account. For example, any user who supplied musical information may be paid by an amount corresponding to the occurrence of download of his music, for example.

As state above, when the digital portable headphone stereo 1 is set in the cavity 3 of the base station 2, then the digital portable headphone stereo 1 is invested with a communication function. Due to the communication function, the digital portable headphone stereo 1 is connected to the network service center 21 via the ISDN line 23. When the digital portable headphone stereo 1 is connected to the network service center 21, a menu image showing, for example, a general classification of music shown in FIG. 3A is sent from the network service center 21 to the digital portable headphone stereo 1 and displayed on the display 11. A desired class is selected by pointing it on the image through the direction key 12 and input keys 13A, 13B.

As a result, a list of titles of pieces of music in the class appears on the menu image. When a desired title is selected from the list by pointing it on the menu image, data of the piece of music is sent from the network service center 21 to the digital portable headphone stereo 1 through the ISDN line 23, and recorded in the hard disc of the digital portable headphone stereo 1.

A possible protocol for transmitting audio data from the network service center 21 is one adding a header to audio data and transmitting the data in packets as shown in FIG. 4. The protocol for transmitting audio data may be either an original protocol or a common protocol such TCP/IP.

Audio data may be transmitted in a compressed form. Although various modes of compression of audio data have been proposed, a compression mode which accounts for the quality of sound is desirable for use with the portable headphone stereo system. For example, ATRAC (Adaptive Transform Acoustic Coding), which is used with MDs, may be used. Alternatively, data may be transmitted in an encoded form to enable real time reproduction of transmitted music data.

Although the above example presents a menu image as means for selecting a desired piece of music, it is also possible to search out a desired piece of music through its title, singer and/or other materials. Alternatively, icons may be displayed on the image plane so that a user can select a desired piece of music by pointing to a corresponding icon through a pointing device.

When the digital portable headphone stereo 1 is carried with the user, it is removed from the base station 2, and a headphone 17 is connected to the headphone terminal 15. Music data stored in the built-in hard disc of the digital portable headphone stereo 1 is reproduced by pressing the fast-forward, play, rewind, stop, pause or other operation key 14, and the reproduced sound is output from the headphone 17.

As explained above, the digital portable headphone stereo 1 using the present invention is configured to store in the interior hard disc the music data transmitted from the network service center 21. Therefore, any latest music can be introduced from the network service center 21, and a variety of users tastes for music can be satisfied. Since the invention uses, for example, ISDN and transmits music data in a compressed form, it does not require a long time for transmission. Moreover, the hard disc used as a recording medium promises a high access speed and is less affected by vibrations than an optical disc.

Figure 6:
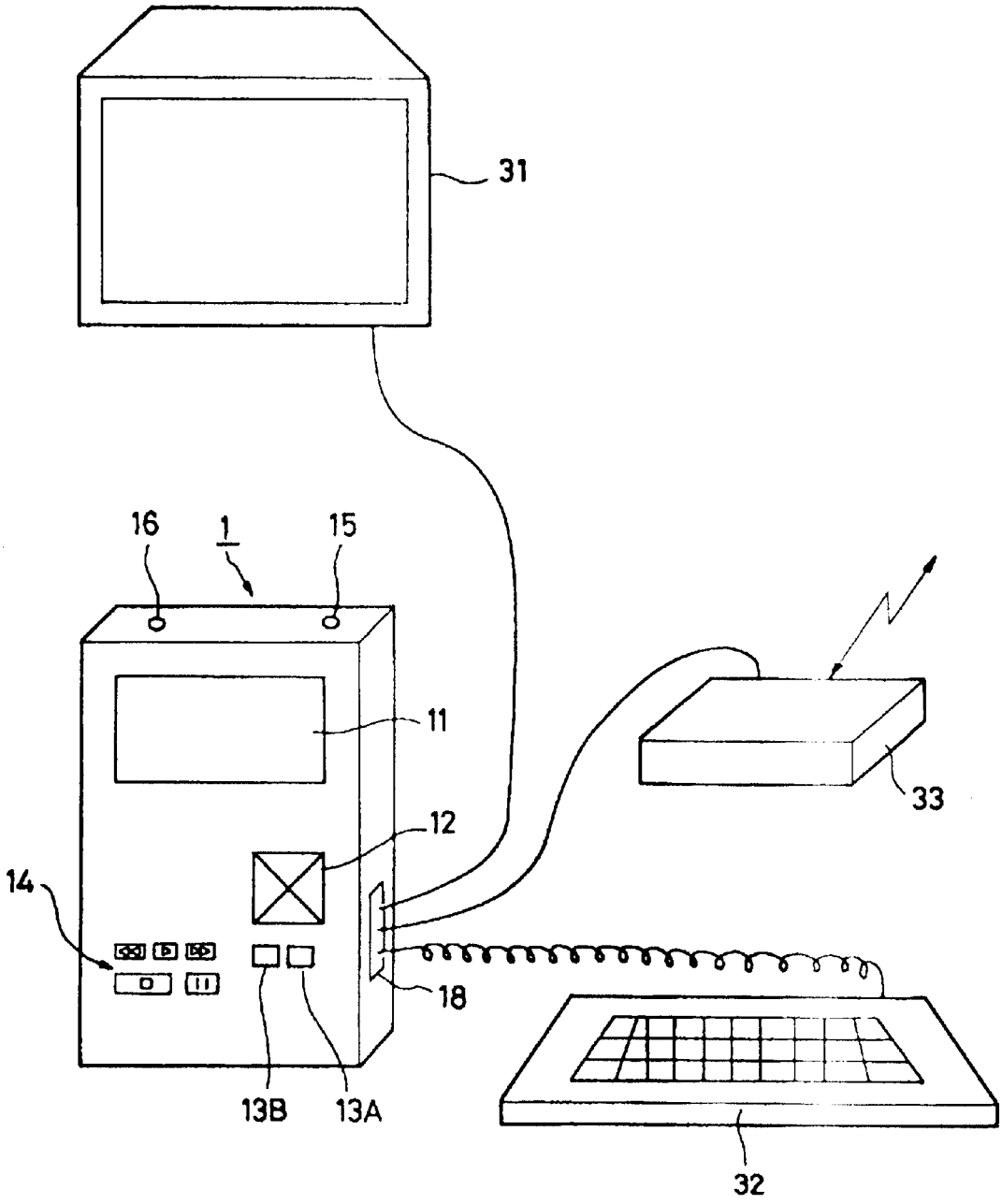
FIG. 6 is a perspective view for use in explanation of a digital portable headphone stereo to which the invention is applied.

Although the above-explained system is made up of the digital portable headphone stereo 1 and the base station 2, it is also possible to externally add a key board and a display to the digital portable headphone stereo 1. That is, as shown in FIG. 6, the digital portable headphone stereo 1 may have a connector 18 to connect a display 31, key board 32, modem or terminal adapter 33.

When a modem or a terminal adapter 33 is connected, the digital portable headphone stereo 1 can be connected to the network service center 21 by the modem or terminal adapter 33, and can be connected to a computer, without using the base station 2. Instead of the modem or terminal adapter, a wireless connection controller can be used for wireless connection between the network service center 21 and the digital portable headphone stereo 1.

When the key board 32 is connected, more detailed commands can be input to use the portable headphone stereo 1 for various purposes. When the display 31 is connected, moving image data can be reproduced to use the network service center 21 as an audio and video data base. The display 31 may be a CRT display, liquid crystal display, plasma display, or any other appropriate display.

Figure 7:
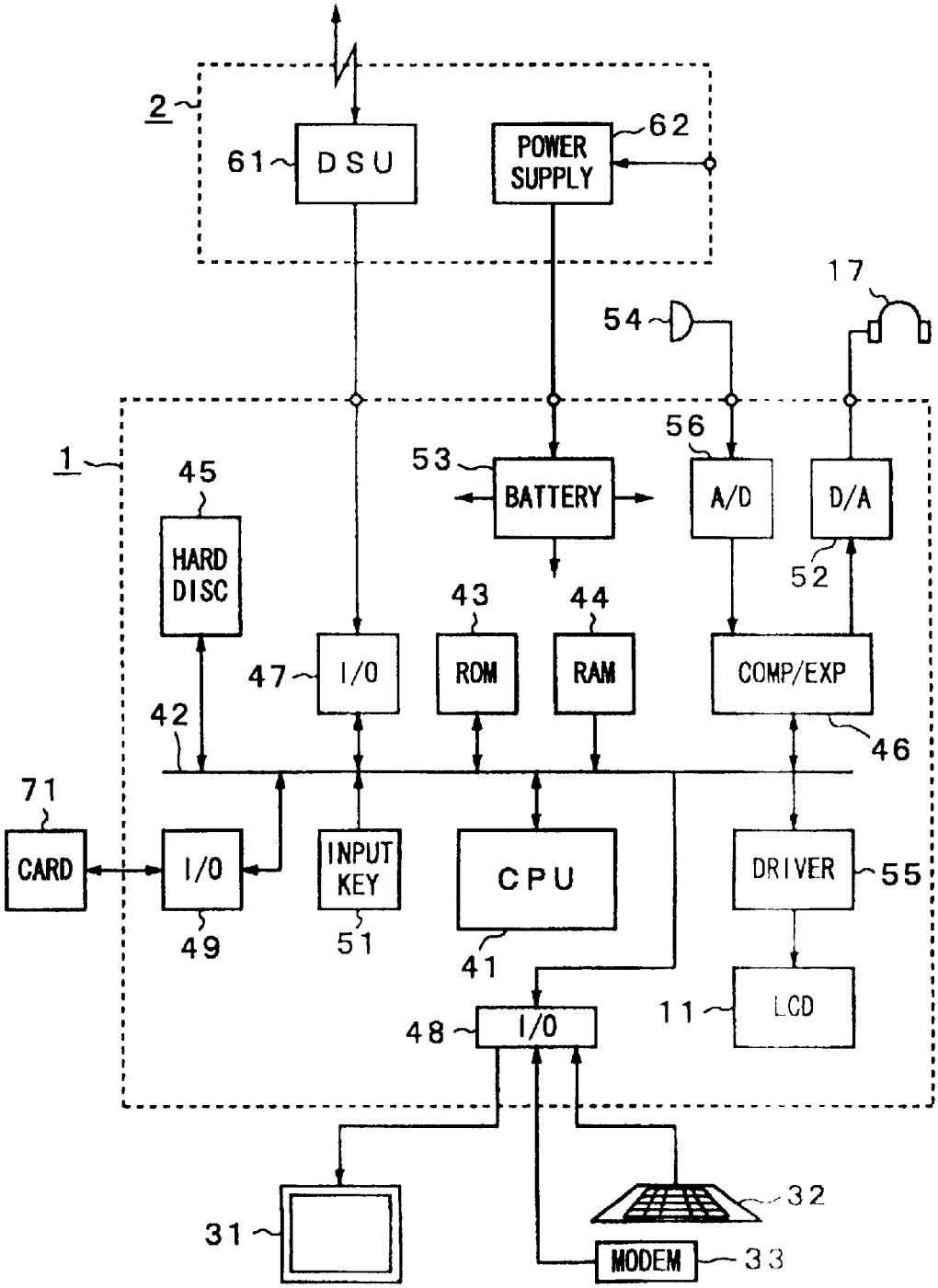
FIG. 7 is a block diagram showing a digital portable headphone stereo to which the invention is applied.

FIG. 7 is a block diagram of a digital portable headphone stereo system using the invention. In FIG. 7, the digital portable headphone stereo 1 has a CPU 41 for controlling the entirety. Connected to a bus 42 from CPU 41 are ROM 43 and RAM 44. Further provided are a hard disc 45 for storing audio data and a compression/expansion circuit 46 for compressing and expanding audio data. Additionally connected to the bus 42 are an I/O port 47 for connecting a DSU (Digital Service Unit) 61 of the base station 2, I/O port 48 for connecting an external key board 32, external modem 33 or external display 31, and I/O port 49 for connecting a card 71 to add various functions. An input key 51 (corresponding to direction key 12, input keys 13A, 13B and operation key 14) and a driver 55 for driving a liquid display 11 are further connected to the bus 42.

The bus 42 is a PC standard bus typically used in the field of personal computers, such as ISA (Industry Standard Architecture) bus widely uses as an AT compatible external bus (also called extensive slot bus or system bus) and PCI (Peripheral Computer Interconnect) bus widely used as a local bus (also called processor direct bus). By employing a circuit arrangement of a compatible architecture that uses such a common bus in the field of personal computers, the invention not only decreases the manufacturing cost of the entire digital portable headphone stereo 1 but also realizes widest use and extensive use of the headphone stereo.

The base station 2 has DSU 61 and a power supply circuit 62. When the digital portable headphone stereo 1 is set on the base station 2, DSU 61 of the base station 2 is connected to the bus 42 of the portable headphone stereo 1 through the I/O port 47. Simultaneously, power is supplied to the battery 53 of the portable headphone stereo 1 to electrically charge the battery 53.

In order to store music data from the network service center 21 in the hard disc 45, the digital portable headphone stereo 1 is set on the base station 2. Thereafter, a command for connection to the network service center 21 is given through the input key 51, and DSU 61 connects the digital portable headphone stereo 1 to the network service center 21. The network service center 21 transmits data in packets by an original protocol or a common protocol like TCP/IP, for example. The packet data is decomposed to extract necessary compressed audio data. The compressed audio data is delivered to and stored in the hard disc 45.

To reproduce data stored in the hard disk 45, a reproduction command is given through the input key 51. In response to the reproduction command, compressed audio data is read out from the hard disc 45, and delivered to the audio compression/expansion circuit 46. The circuit 46 expands the audio data that has been compressed by ATRAC, for example. The expanded audio data is supplied to the headphone 17 through the D/A converter 52.

To store an audio signal from the microphone 54, a record command is given through the input key 51. In response to the record command, the audio signal from the microphone 54 is supplied to the A/D converter 56, and converted into a digital form. The audio data is then supplied to and compressed by the audio compression/expansion circuit 46. The compressed audio data is delivered to the hard disc 45 through the bus 42, and stored there.

Figure 8:
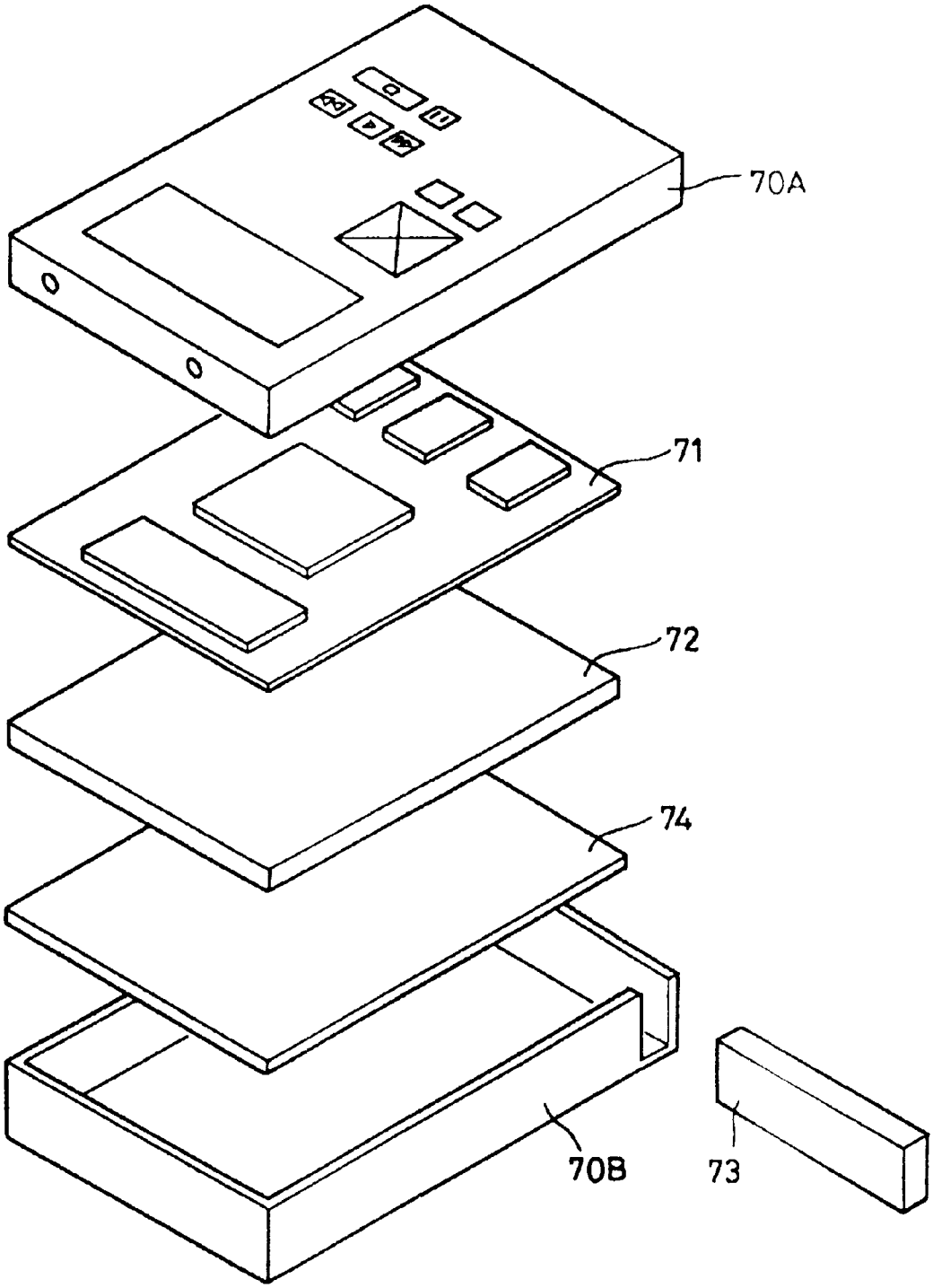
FIG. 8 is a perspective view showing the arrangement of a digital portable headphone stereo to which the invention is applied.

In order to minimize the dimension and weight of the digital portable headphone stereo 1, a main circuit board incorporating major parts and a card-type hard disc are used. FIG. 8 is a perspective view of the interior structure of the digital portable headphone stereo 1. Shells 70A and 70B of the digital portable headphone stereo 1 contain the main circuit board 71, card-type hard disc 72, and a battery 73. Additionally, an extensive function card 74 can be set.

All major circuit parts including CPU 41, ROM 43 and RAM 44 are arranged on the main circuit board 71. Already developed are main circuit boards as small as PCMCIA cards using a CPU of the grade around 80386. Small-sized main circuit boards using a faster CPU will be developed in a near future.

The hard disc 72 may be one using a 1.8-inch disc and having approximately the same dimension as that of a PCMCIA card and the thickness of 5 mm. The digital portable headphone stereo 1 uses the card-type hard disc 72 to minimize the dimension of the device. Currently available is a card-type hard disc of 121 MB. In a near future, those of the capacity around 1 GB will be developed.

If the sampling frequency is 30 kHz, and the quantized bits are 16 bits, then a user can enjoy reproduction of music over approximately 33 minutes by using a 20 MB hard disc. If the compression rate is doubled, the user will be able to enjoy reproduced music over 30 minutes approximately by using a 50 MB hard disc. Since the duration around 30 minutes of reproduced music is considered sufficient in most cases, the use of a double compression rate and a 50 MB hard disc will be satisfactory for the time being. If a card-type hard disc of the capacity around 1 GB is developed in the near future, longer reproduction with a higher quality of sound will be realized.

Although the above example uses the card-type hard disc, a phase-change optical disc or optical magnetic disc may be used. If a card-type optical disc or magnetic disc is developed, it may be used in the same manner as a card-type hard disc.

Figure 9A:
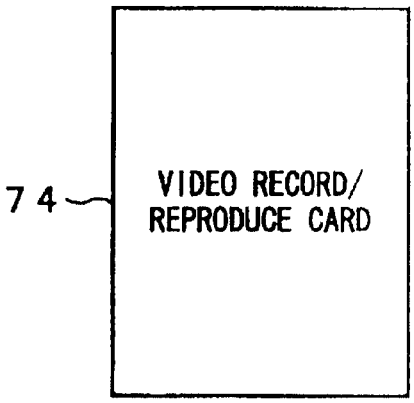
FIGS. 9A to 9F are schematic diagrams for use in explanation of extensive cards in a digital portable headphone stereo to which the invention is applied.
Figure 9B:
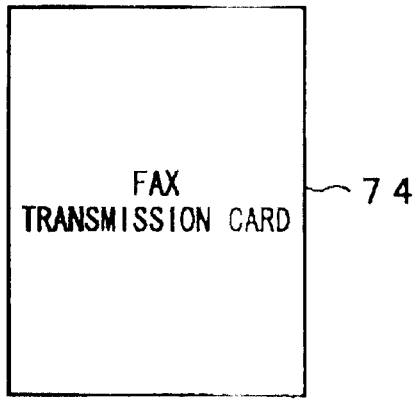
Figure 9C:
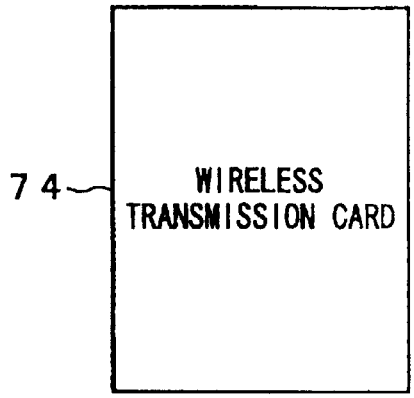
Figure 9D:
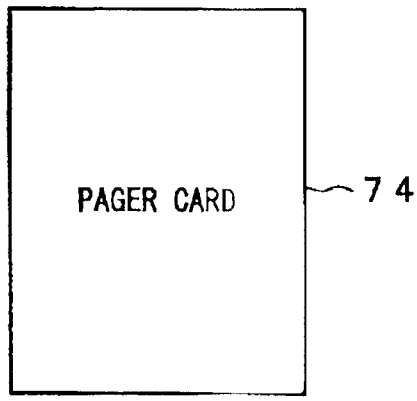
Figure 9E:
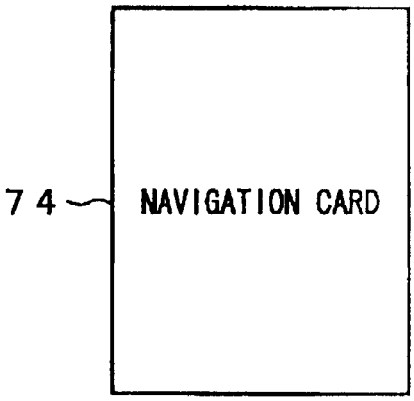
Figure 9F:
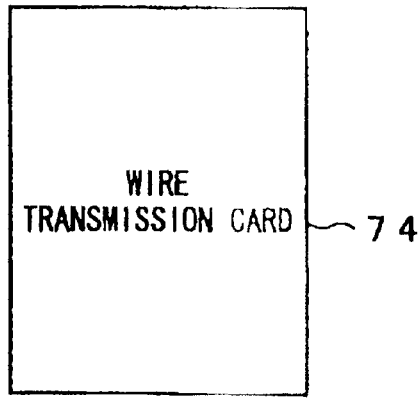

The extensive function card 74 is used to add a further function of the digital portable headphone stereo 1. The extensive function card 74 has approximately the same dimension as a PCMCIA card. FIGS. 9A to 9F show proposed extensive function cards, namely, a video record/reproduce card for compression and expansion of MPEG or other moving images (FIG. 9A), facsimile transmission card enabling facsimile transmission (FIG. 9B), wireless transmission card enabling wireless transmission of data (FIG. 9C), pager card giving a pager function (FIG. 9D), navigation card for enabling navigation using GPS, for example (FIG. 9E), and wire transmission card for wire transmission of data (FIG. 9F). By connecting the extensive function card 74, the digital portable headphone stereo 1 is equipped with an additional function, and various modes of use of the digital portable headphone stereo 1 can be expected.

According to the invention, a network service center for supplying numerous pieces of music data and digital portable stereo headphone players are connected by ISDN lines so that desired music data is obtained from the network service center and recorded in a hard disc for later reproduction. Audio data is recorded in a digital form to improve the quality of sound. By using a card-type hard disc, the invention can increase the access speed and can reduce the dimension and weight of the player. Since a user can choose desired music from the storage of the network service center, he can use his player conveniently by obtaining any desired music any time from a large storage in the service center. Therefore, the system can satisfy various users tastes for music and can follow the latest fashion of music. When a digital portable stereo headphone player is fixed on a base station, then a communication function is added to the player, and the battery of the player can be electrically charged simultaneously. Any new additional function can be added to a digital portable stereo headphone player by mounting an extensive function card, and this promises further developments of such players.

That is, used as the bus for connecting respective parts is a PC standard bus (for example, ISA bus or PCI bus) which is most standard in the field of personal computers. By employing a circuit arrangement of a compatible architecture that uses such a common bus in the field of personal computers, the invention not only decreases the manufacturing cost of the entire digital portable headphone stereo but also realizes widest use and extensive use of the headphone stereo.

What is claimed is:

[1. An audio reproducing apparatus, comprising:

control means for controlling entire behaviors;

storage means for writing and reading data;

audio expanding means for expanding compressed audio data;

external I/O means for transferring incoming and outgoing data, the transferring of incoming and outgoing data operative to charge an account associated with the transfer of such incoming and outgoing data; and a personal computer standard bus for transmitting data among said control means, said storage means, said audio expanding means and said external I/O means, so that compressed audio data is stored in said storage means, and said compressed audio data is transferred to and expanded by said audio expanding means to be audibly reproduced.]

[2. The audio reproducing apparatus according to claim 1, wherein said storage means is a card-shaped recording medium.]

[3. The audio reproducing apparatus according to claim 1, wherein said storage means is a card-shaped hard disc.]

[4. The audio reproducing apparatus according to claim 1, wherein said personal computer standard bus is one of external buses including an ISA bus used in AT compatible machines and local buses including a PCI bus.]

[5. An audio recording apparatus, comprising:

control means for controlling entire behaviors;

storage means for writing and reading data;

audio compressing means for compressing audio data;

external I/O means for transferring incoming and outgoing data; and a personal computer standard bus for transmitting data among said control means, said storage means, said audio compressing means and said external I/O means, wherein incoming data sent in a predetermined format is transferred through said external I/O means, and compressed audio data is generated from the transferred incoming data and stored in said storage means, the transferring of incoming and outgoing data operative to charge an account associated with the transfer of such incoming and outgoing data.]

[6. The audio reproducing apparatus according to claim 5, wherein said storage means is a card-shaped recording medium.]

[7. The audio reproducing apparatus according to claim 5, wherein said storage means is a card-shaped hard disc.]

[8. The audio recording apparatus according to claim 5, wherein said personal computer standard bus is one of external buses including an ISA bus used in AT compatible machines and local buses including a PCI bus.]

[9. An audio recording and reproducing system, comprising:

an audio recording and reproducing apparatus incorporating control means for controlling entire behaviors;

storage means for writing and reading data;

audio expanding means for expanding compressed audio data;

external I/O means for transferring incoming and outgoing data, the transferring of incoming and outgoing data operative to charge an account associated with the transfer of such incoming and outgoing data;

first functional means removably attached to said audio recording and reproducing apparatus to add a supplementary function to said audio recording and reproducing apparatus; and second functional means removably attached to said audio recording and reproducing apparatus to add a new function to said audio recording and reproducing apparatus.]

[10. The audio recording and reproducing system according to claim 9, wherein said first functional means has a structure that can contain the entirety of said audio recording and reproducing apparatus.]

[11. The audio recording and reproducing system according to claim 9, wherein said first functional means has a communication function and/or a power supply function.]

[12. The audio recording and reproducing system according to claim 9, wherein said second functional means is in form of a card that can be held within said audio recording and reproducing apparatus.]

[13. An audio recording and reproducing system comprising:

an audio recording and reproducing apparatus incorporating control means for controlling entire behaviors, storage means for writing and reading data, audio expanding means for expanding compressed audio data, and external I/O means for exchanging incoming data;

first functional means removably attached to said audio recording and reproducting apparatus to add a supplementary function to said audio recording and reproducing apparatus; and second functional means removably attached to said audio recording and reproducing apparatus to add a new function to said audio recording and reproducing apparatus, wherein said second functional means adds the function of at least one of video compression, facsimile transmission, wireless transmission, pager, navigation and wire transmission.]

[14. The audio recording and reproducing system according to claim 13, wherein said first functional means has a structure that can contain the entirety of said audio recording and reproducing apparatus.]

[15. The audio recording and reproducing system according to claim 13, wherein said first functional means has a communication function and/or a power supply function.]

[16. The audio recording and reproducing system according to claim 13, wherein said second functional means is in form of a card that can be held within said audio recording and reproducing apparatus.]

[17. An audio data transmission method, comprising the steps of:

receiving desired audio data through a communication line from an audio data base storing a plurality of pieces of audio data;

storing said data in a receiver to thereafter reproduce the audio data within the receiver, wherein said audio data base is configured to send out to said receiver data in a predetermined transmission format for and to charge the service to an account of said receiver, the data in a predetermined transmission format including the audio data.]

[18. The audio data transmission method according to claim 17, wherein said receiver obtains audio data by decomposing the data in said predetermined transmission format.]

[19. The audio data transmission method according to claim 17, wherein said audio data base and said receiver are connected via public telephone line.]

[20. An information receiving apparatus, comprising:

means for choosing desired audio data from an audio data base storing a plurality of pieces of audio data;

means for receiving desired audio data through a communication line and for storing the chosen audio data; and means for reproducing the stored audio data, wherein in response to receipt of the desired audio data an account associated with the receipt of desired audio data is charged.]

*21. A base station apparatus comprising:*

*a base station body having four exterior sides in rectangular form with an interior cavity, the interior cavity configured to receive an entirety of an audio reproducing apparatus therein;*

*a power supply terminal configured to supply power to a battery of the audio reproducing apparatus, the power supply terminal of the base station on upper surface of a lower portion of the base station body, the power supply terminal of the base station configured to mate with and electrically connect to a power supply terminal of the audio reproducing apparatus; and*

*a fixing portion configured to fix the base station body on a wall,*

*the audio reproducing apparatus including,*

*a data terminal configured to receive compressed digital audio data from an external device;*

*a memory configured to store the compressed digital audio data,*

*an expander configured to expand compressed digital audio data and output digital audio data, and*

*the power supply terminal configured to mate with and electrically connect to the power supply terminal of the base station, the power supply terminal of the audio reproducing apparatus located on a lower surface of the audio reproducing apparatus.*

*22. A base station apparatus comprising:*

*a base station body including a recess portion configured to receive an audio reproducing apparatus therein;*

*a power supply terminal configured to supply power to a battery of the audio reproducing apparatus; and*

*a fixing portion configured to fix the base station body on a wall,*

*the audio reproducing apparatus including,*

*a data terminal configured to receive compressed digital audio data from an external device,*

*a memory configured to store the compressed digital audio data, and*

*an expander configured to expand compressed digital audio data and output digital audio data.*

*23. The base station recited in claim 22, further comprising:*

*a data terminal configured to exchange data between a network and the audio reproducing apparatus.*

*24. The base station recited in claim 23, wherein the data terminal of the base station is connected to the network through an ISDN line.*

*25. The base station recited in claim 23, wherein the data terminal of the base station is configured to mate with and electrically connect to the data terminal of the audio reproducing apparatus.*

*26. The base station recited in claim 22, wherein the power supply terminal of the base station is configured to mate with and electrically connect to a power supply terminal of the audio reproducing apparatus.*

*27. The base station recited in claim 22, wherein the base station body has four exterior sides in rectangular form with an interior cavity, the interior cavity configured to receive an entirety of the audio reproducing apparatus therein.*

*28. The base station recited in claim 22, wherein the audio reproducing apparatus includes a power supply terminal configured to mate with and electrically connect to the power supply terminal of the base station, the power supply terminal of the audio reproducing apparatus located on a lower surface of the audio reproducing apparatus.*

*29. A system comprising:*

*a base station; and*

*an audio reproducing apparatus,*

*the base station including,*

*a base station body including a recess portion configured to receive the audio reproducing apparatus therein;*

*a power supply terminal configured to supply power to a battery of the audio reproducing apparatus; and*

*a fixing portion configured to fix the base station body on a wall,*

*the audio reproducing apparatus including,*

*a power supply terminal configured to mate with and electrically connect to the power supply terminal of the base station;*

*a data terminal configured to receive compressed digital audio data from an external device;*

*a memory configured to store the compressed digital audio data; and*

*an expander configured to expand compressed digital audio data and output digital audio data.*

*30. The system recited in claim 29, wherein the base station further comprises a data terminal configured to exchange data between a network and the audio reproducing apparatus.*

*31. The system recited in claim 30, wherein the data terminal of the base station is connected to the network through an ISDN line.*

*32. The system recited in claim 30, wherein the data terminal of the base station is configured to mate with and electrically connect to the data terminal of the audio reproducing apparatus.*

*33. The base station recited in claim 30, wherein the power supply terminal of the base station is configured to mate with and electrically connect to a power supply terminal of the audio reproducing apparatus.*

*34. The system recited in claim 33, wherein the data terminal and power supply terminal of the base station is located on an upper surface of a lower portion of the base station body, and the data terminal and power supply terminal of the audio reproducing apparatus is located on a lower surface of the audio reproducing apparatus.*

*35. A system comprising:*

*a base station; and*

*an audio reproducing apparatus,*

*the base station including,*

*a base station body having four exterior sides in rectangular form with an interior cavity, the interior cavity configured to receive an entirety of the audio reproducing apparatus therein;*

*a power supply terminal configured to supply power to a battery of the audio reproducing apparatus, the power supply terminal of the base station on upper surface of a lower portion of the base station body, the power supply terminal of the base station configured to mate with and electrically connect to a power supply terminal of the audio reproducing apparatus; and*

*a fixing portion configured to fix the base station body on a wall,*

*the audio reproducing apparatus including,*

*a data terminal configured to receive compressed digital audio data from an external device;*

*a memory configured to store the compressed digital audio data;*

*an expander configured to expand compressed digital audio data and output digital audio data; and*

*the power supply terminal configured to mate with and electrically connect to the power supply terminal of the base station, the power supply terminal of the audio reproducing apparatus located on a lower surface of the audio reproducing apparatus.*

*36. The system recited in claim 35, wherein the base station further comprises a data terminal configured to exchange data between a network and the audio reproducing apparatus.*

*37. The system recited in claim 36, wherein the data terminal is connected to the network through an ISDN line.*

*38. The system recited in claim 36, wherein the data terminal of the base station is configured to mate with and electrically connect to the data terminal of the audio reproducing apparatus, the data terminal of the base station is located on the upper surface of the lower portion of the base station body, and the data terminal of the audio reproducing apparatus is located on the lower surface of the audio reproducing apparatus.*

* * * * *